United States Patent
Kwak et al.

(10) Patent No.: US 11,978,344 B2
(45) Date of Patent: May 7, 2024

(54) METHOD FOR TRANSMITTING, BY UE, MESSAGE IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Minsung Kwak, Seoul (KR); Seungryul Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 156 days.

(21) Appl. No.: 17/611,775

(22) PCT Filed: May 25, 2020

(86) PCT No.: PCT/KR2020/006757
§ 371 (c)(1),
(2) Date: Nov. 16, 2021

(87) PCT Pub. No.: WO2020/242162
PCT Pub. Date: Dec. 3, 2020

(65) Prior Publication Data
US 2022/0238021 A1     Jul. 28, 2022

(30) Foreign Application Priority Data

May 24, 2019    (KR) .................. 10-2019-0061375

(51) Int. Cl.
*G08G 1/16* (2006.01)
*H04W 4/021* (2018.01)
*H04W 4/40* (2018.01)

(52) U.S. Cl.
CPC ............ *G08G 1/161* (2013.01); *H04W 4/021* (2013.01); *H04W 4/40* (2018.02)

(58) Field of Classification Search
CPC ....... G08G 1/161; G08G 1/163; H04W 4/021; H04W 4/40; H04W 72/12; H04W 28/02; H04W 92/18
See application file for complete search history.

(56) References Cited

U.S. PATENT DOCUMENTS

2020/0100048 A1*   3/2020   Wu ................... H04W 28/0268
2020/0119775 A1*   4/2020   Park ................. G08G 1/096783
(Continued)

FOREIGN PATENT DOCUMENTS

KR     1020180089435 A     8/2018

OTHER PUBLICATIONS

MediaTek Inc., "On sidelink resource allocation mechanism", 3GPP TSG RAN WG1 Ad-Hoc Meeting 1901, Jan. 21-25, 2019, R1-1900199.
(Continued)

*Primary Examiner* — An T Nguyen
(74) *Attorney, Agent, or Firm* — BRYAN CAVE LEIGHTON PAISNER LLP

(57) ABSTRACT

According to various embodiments, disclosed are a method for transmitting, by a user equipment (UE), a message in a wireless communication system supporting a sidelink, and an apparatus therefor. A method for transmitting, by a first UE, a message in a wireless communication system supporting a sidelink, and an apparatus therefor are disclosed, the method comprising the steps of: obtaining state information including geographic location information; receiving a first message from a second UE; and determining whether to stop transmission of a second message, on the basis of the state information and whether the first message includes information on a geographic area.

11 Claims, 22 Drawing Sheets

(56) References Cited

U.S. PATENT DOCUMENTS

| | | | | |
|---|---|---|---|---|
| 2020/0178199 A1* | 6/2020 | Chae | .................... | H04B 7/0621 |
| 2020/0288482 A1* | 9/2020 | Yi | ........................ | H04L 5/0037 |
| 2020/0296692 A1* | 9/2020 | Lee | .................... | H04W 52/383 |
| 2020/0329530 A1* | 10/2020 | Holmberg | ............. | G06F 3/0655 |
| 2020/0404543 A1* | 12/2020 | Yamine | ................ | H04W 28/10 |
| 2021/0179137 A1* | 6/2021 | Gillett | ................... | G06Q 10/02 |
| 2021/0298030 A1* | 9/2021 | Li | ........................ | H04W 72/23 |
| 2021/0366278 A1* | 11/2021 | Park | ....................... | G08G 1/093 |

OTHER PUBLICATIONS

Intel Corporation, "Physical layer procedures for NR V2X sidelink communication", 3GPP TSG RAN WG1 Meeting 97, May 13-17, 2019, R1-1906799.

Sequans Communications, "On HARQ procedure for NR sidelink", 3GPP TSG RAN WG1 Meeting #97, May 13-17, 2019, R1-1907083.

Qualcomm Incorporated, "VRU Device Considerations", 3GPP TSG-WG4 Meeting #103, Apr. 8-12, 2019, S4-190322.

* cited by examiner (a)

(b)

(a)

(b)

(a)

(b)

(c)

METHOD FOR TRANSMITTING, BY UE, MESSAGE IN WIRELESS COMMUNICATION SYSTEM SUPPORTING SIDELINK, AND APPARATUS THEREFOR

This application is the National Stage filing under 35 U.S.C. 371 of International Application No. PCT/KR2020/006757 filed on May 25, 2020, which claims priority to Korean Patent Application No. 10-2019-0061375 filed on May 24, 2019, the contents of which are all hereby incorporated by reference herein in their entirety.

TECHNICAL FIELD

The present disclosure relates to a method of transmitting a message by a user equipment (UE) in a wireless communication system supporting sidelink and apparatus therefor, and more particularly to, a method by which a UE determines transmission of a second message based on a first message received from another UE when the first message is a message for clustering and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

The object of the present disclosure is to provide a method and apparatus for determining whether to transmit a message based on clustering in an environment where user equipments (UEs) are dense in order to not only ensure the user safety of the UEs while minimizing unnecessary redundant message transmission but also minimize communication traffic and power consumption of the UEs when the UEs are dense.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

In an aspect of the present disclosure, a method of transmitting a message by a first user equipment (UE) in a wireless communication system supporting sidelink is provided. The method may include: obtaining state information including geographic location information; receiving a first message from a second UE; and determining whether to stop transmission of a second message based on the state information and whether information on a geographic area is included in the first message.

The first UE may transmit the second message including information on a cluster area to form a cluster for UEs belonging to the cluster area.

When the location information on the first UE belongs to the geographic area included in the first message, the transmission of the second message may be stopped.

When the first message includes no geographic area information or when the location information on the first UE does not belong to the geographic area included in the first message, the second message may be transmitted.

When the first message further includes a first collision risk value, the first UE may determine whether to stop the transmission of the second message by further considering the first collision risk value included in the first message.

When the location information on the first UE belongs to the geographic area and when a second collision risk value estimated based on the state information is less than or equal to the first collision risk value, the transmission of the second message may be stopped.

When the first message further includes time information, the first UE may determine whether to stop the transmission of the second message by considering both the time information and the geographic area.

When a collision area and a collision time where and when a collision is expected based on the state information correspond to the geographic area and the time information included in the first message, respectively, the transmission of the second message may be stopped.

When the collision area and the collision time where and when the collision is expected based on the state information are different from the geographic area and the time information included in the first message, respectively, the second message may be transmitted with information on the expected collision area and collision time.

When the first UE leaves the geographic area after stopping the transmission of the second message, the first UE may resume the transmission of the second message.

The information on the geographic area may include information on a reference location, information on a shape of the geographic area, and information on a size of the geographic area.

Each of the first message and the second message may be a vulnerable road user awareness message (VAM).

In another aspect of the present disclosure, a first UE configured to transmit a safety message in a wireless communication system supporting sidelink is provided. The first UE may include: a radio frequency (RF) transceiver; and a processor connected to the RF transceiver. The processor may be configured to: obtain state information including location information; control the RF transceiver to receive a first message from a second UE; and determine whether to stop transmission of a second message based on the state information and whether information on a geographic area is included in the first message.

In a further aspect of the present disclosure, a chipset configured to transmit a safety message in a wireless communication system supporting sidelink is provided. The chipset may include: at least one processor; and at least one memory operably connected to the at least one processor and configured to, when executed, cause the at least one processor to perform operations. The operations may include: obtaining state information including location information; controlling an RF transceiver to receive a first message from a second UE; and determining whether to stop transmission of a second message based on the state information and whether information on a geographic area is included in the first message.

The at least one processor may be configured to control a driving mode of a device connected to the chipset based on the state information.

Advantageous Effects

According to various embodiments, whether a message is transmitted may be determined based on clustering in an environment where user equipments (UEs) are dense, thereby not only ensuring the user safety of the UEs while minimizing unnecessary redundant message transmission but also minimizing communication traffic and power consumption of the UEs when the UEs are dense.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
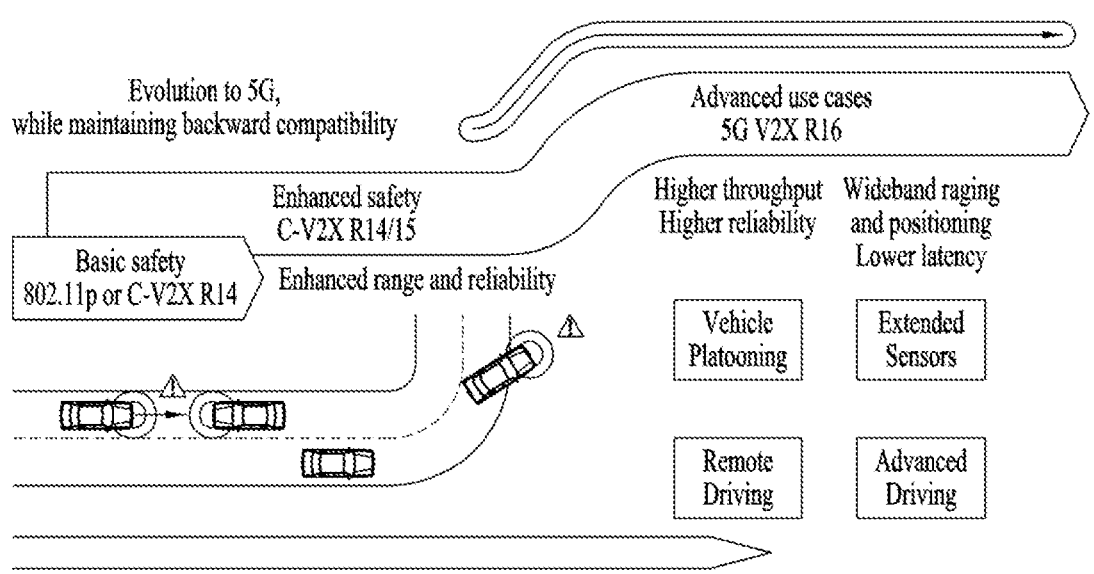
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
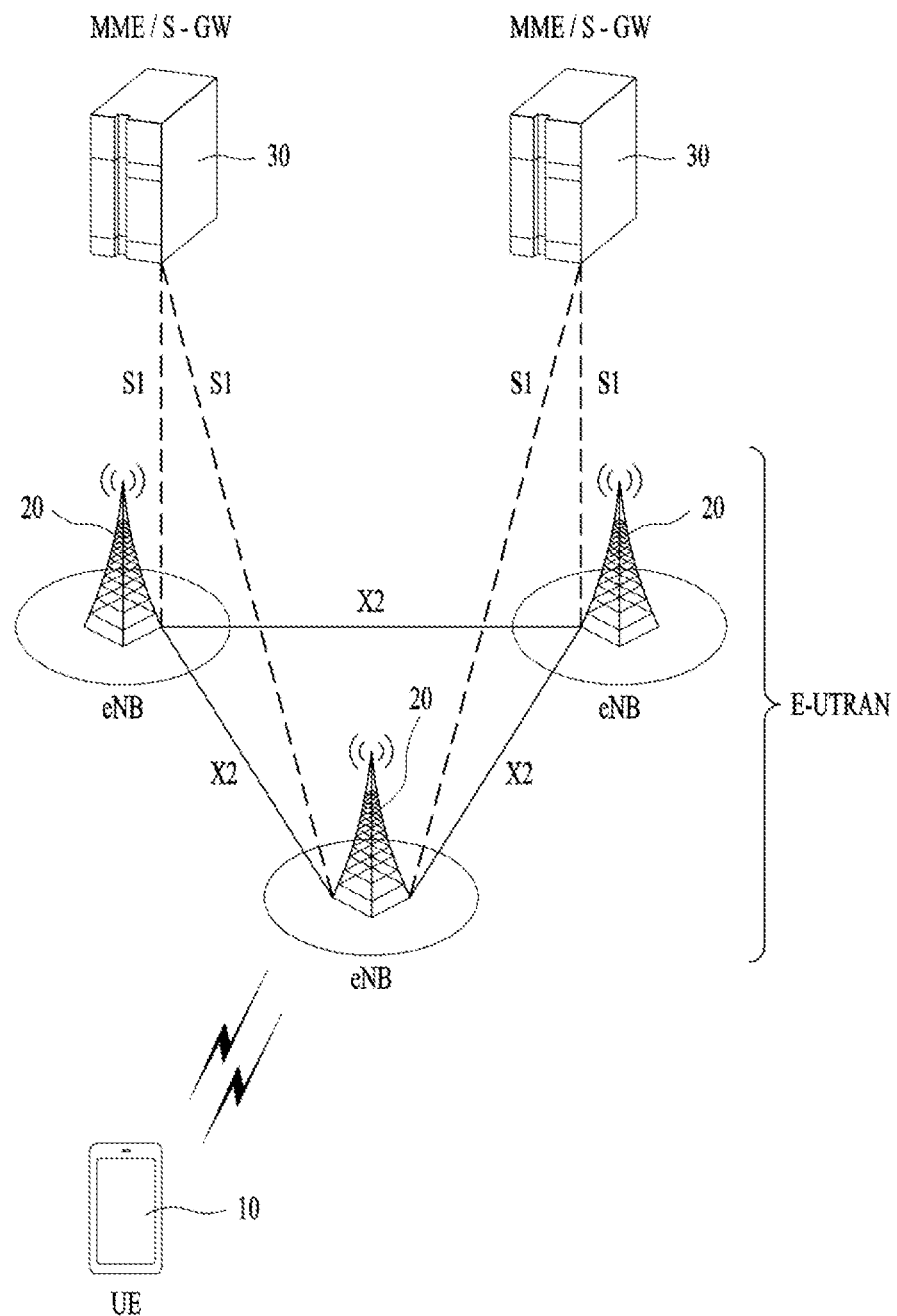
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
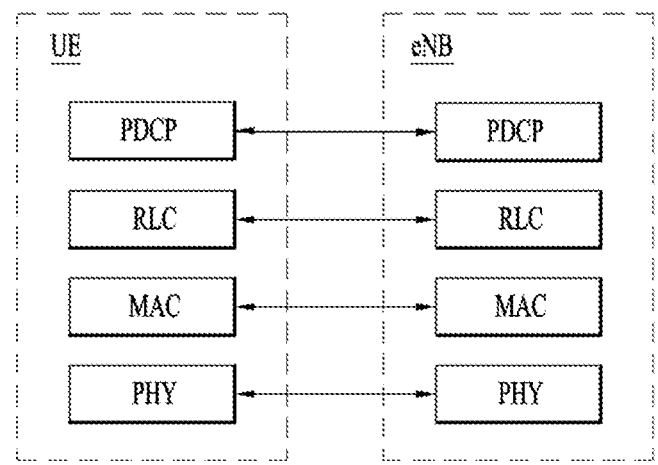
FIG. 3 illustrates a user-plane radio protocol architecture to which embodiment(s) are applicable.

FIG. 3 illustrates a user-plane radio protocol architecture to which the present disclosure is applicable.

Figure 4:
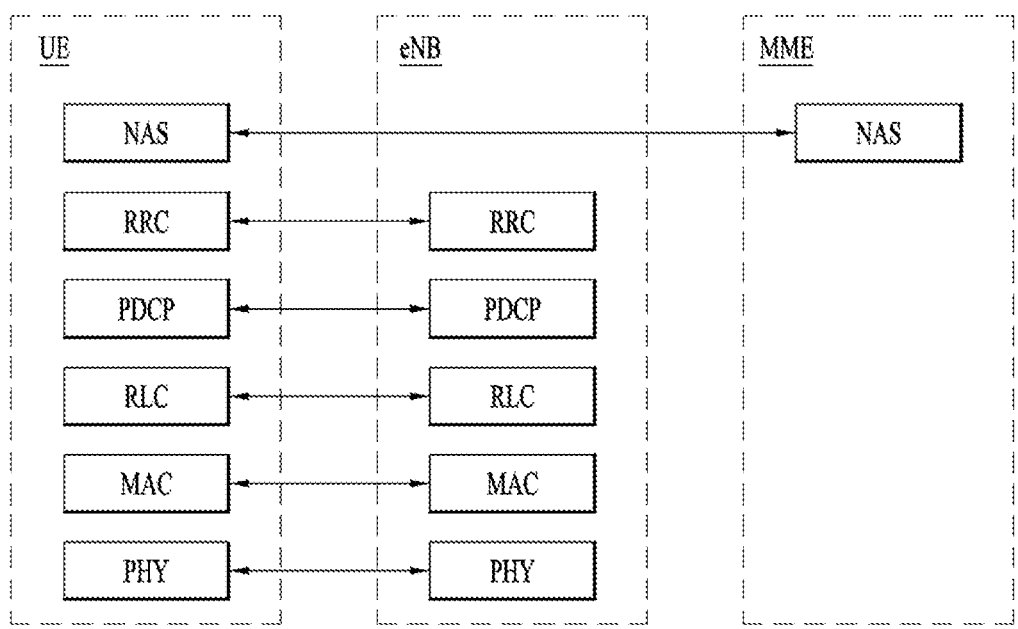
FIG. 4 illustrates a control-plane radio protocol architecture to which embodiment(s) are applicable.

FIG. 4 illustrates a control-plane radio protocol architecture to which the present disclosure is applicable. A user plane is a protocol stack for user data transmission, and a control plane is a protocol stack for control signal transmission.

Referring to FIGS. 3 and 4, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel A transmission time interval (TTI) is a unit time for subframe transmission.

Figure 5:
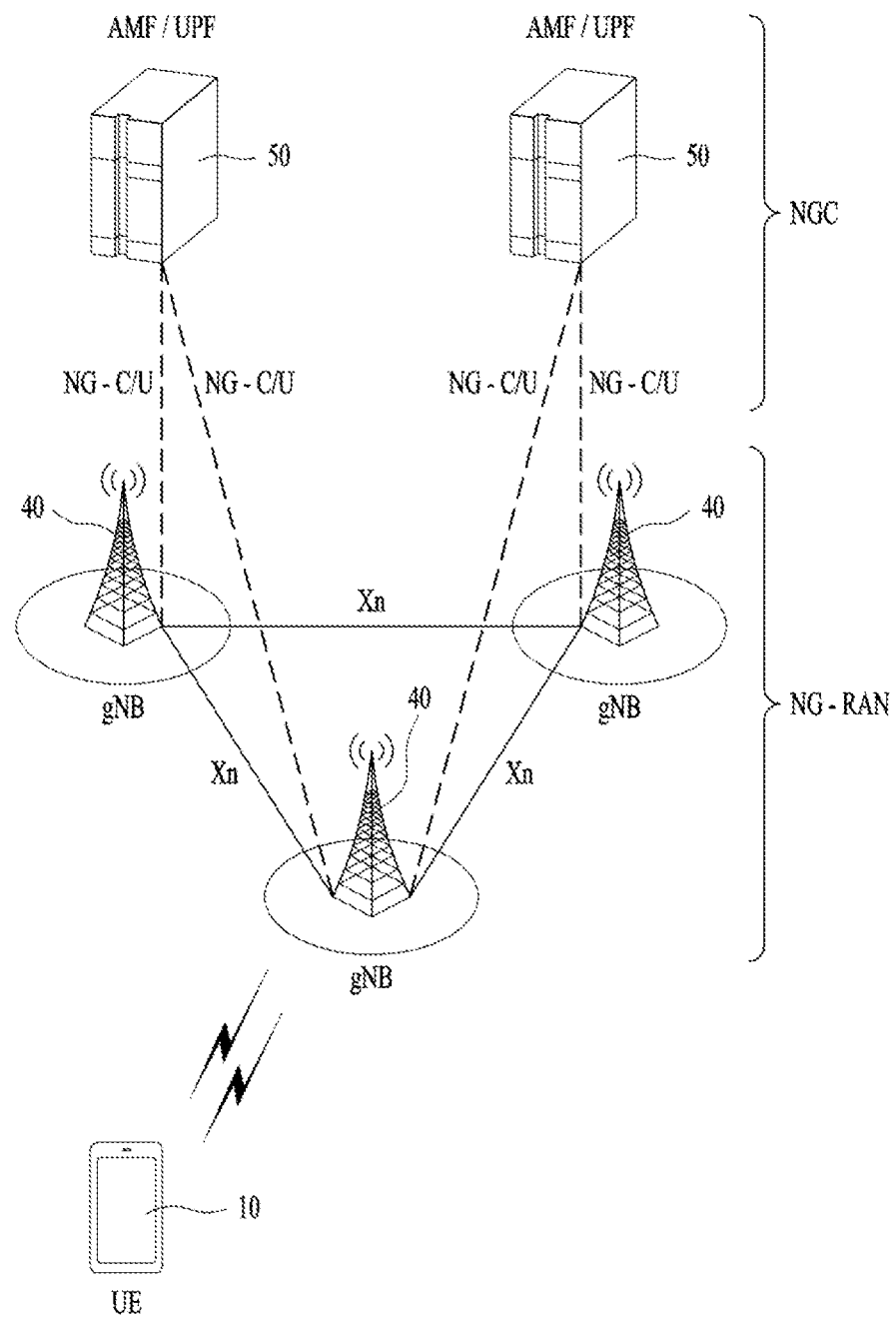
FIG. 5 illustrates the structure of an NR system to which embodiment(s) are applicable.

FIG. 5 illustrates the structure of a NR system to which the present disclosure is applicable.

Referring to FIG. 5, a next generation radio access network (NG-RAN) may include a next generation Node B (gNB) and/or an eNB, which provides user-plane and control-plane protocol termination to a UE. In FIG. 5, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 6:
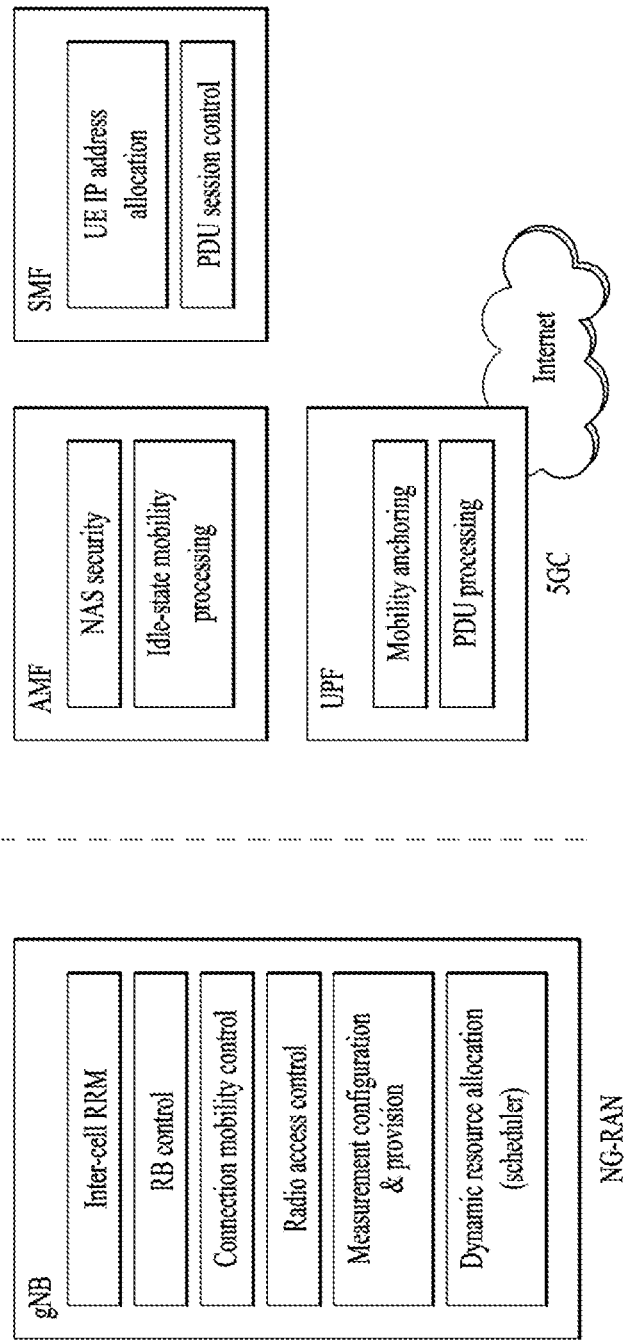
FIG. 6 illustrates functional split between an NG-RAN and a 5GC to which embodiment(s) are applicable.

FIG. 6 illustrates functional split between the NG-RAN and the 5GC to which the present disclosure is applicable.

Referring to FIG. 6, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 7:
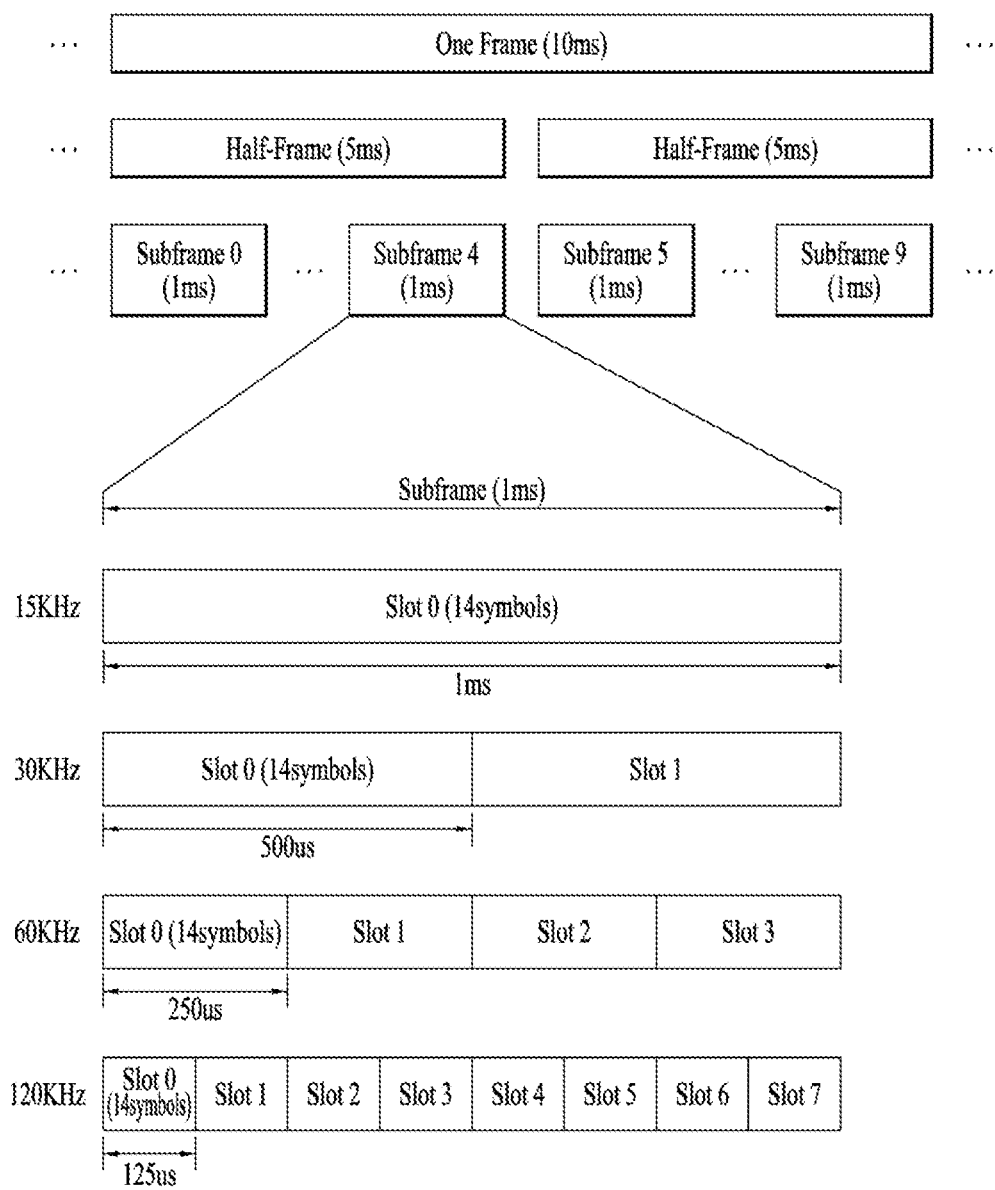
FIG. 7 illustrates the structure of an NR radio frame to which embodiment(s) are applicable.

FIG. 7 illustrates the structure of a NR radio frame to which the present disclosure is applicable.

Referring to FIG. 7, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration µ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 8:
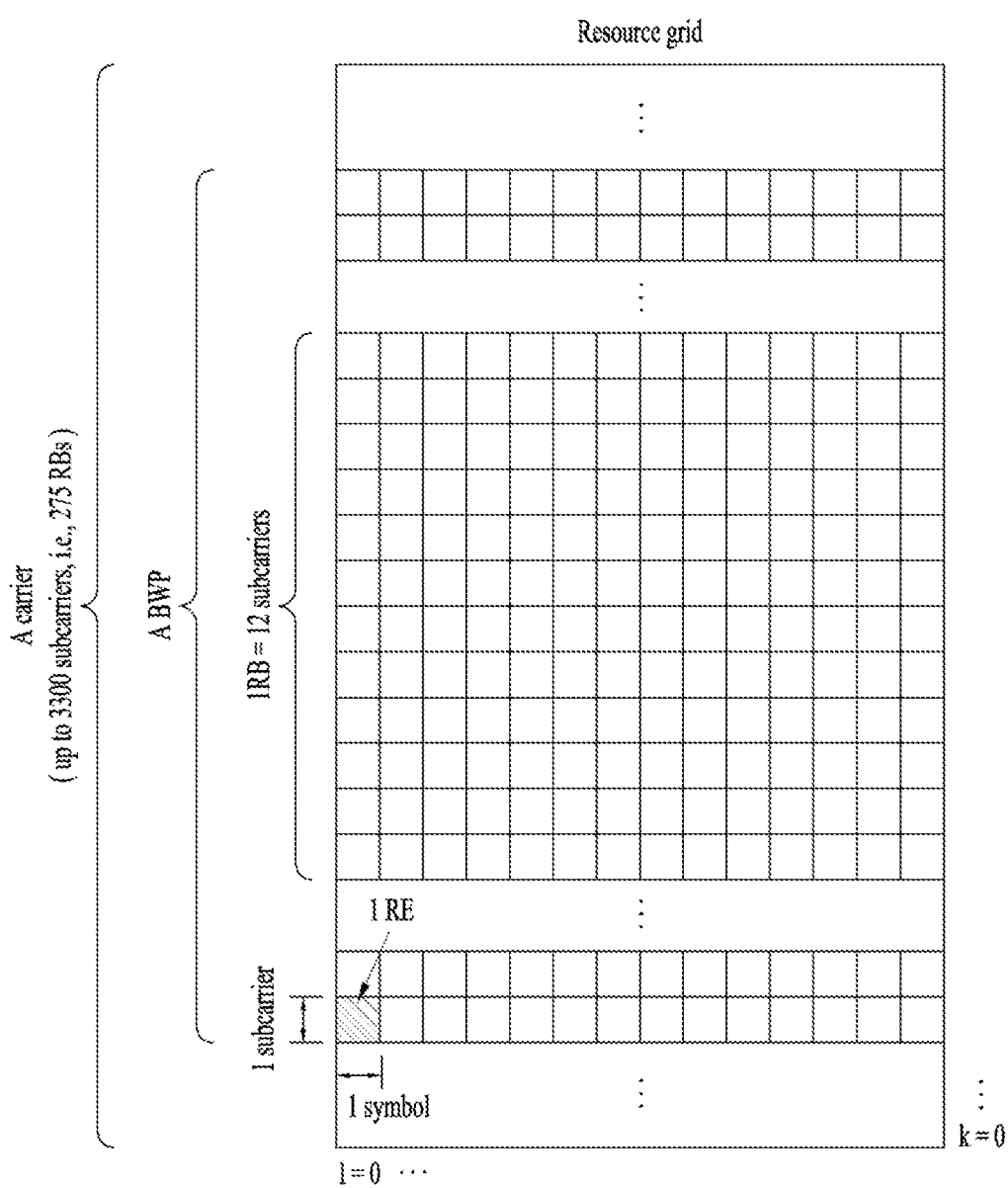
FIG. 8 illustrates the slot structure of an NR frame to which embodiment(s) are applicable.

FIG. 8 illustrates the slot structure of a NR frame to which the present disclosure is applicable.

Referring to FIG. 8, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 9:
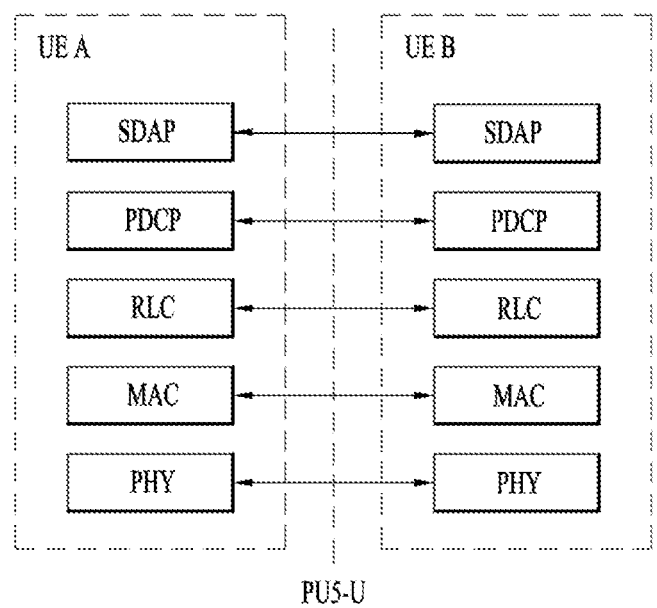
FIG. 9 illustrates a radio protocol architecture for SL communication.
Figure 9:
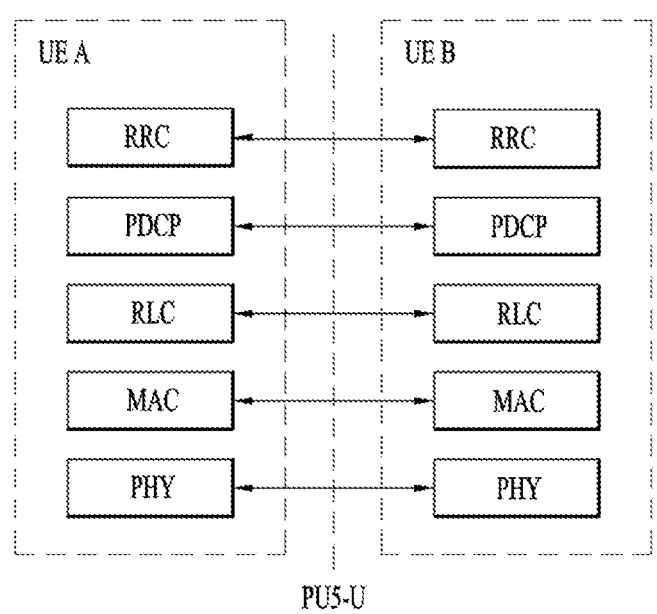

FIG. 9 illustrates a radio protocol architecture for SL communication. Specifically, FIG. 9-(a) shows a user plane protocol stack of NR, and FIG. 9-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission Period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 10:
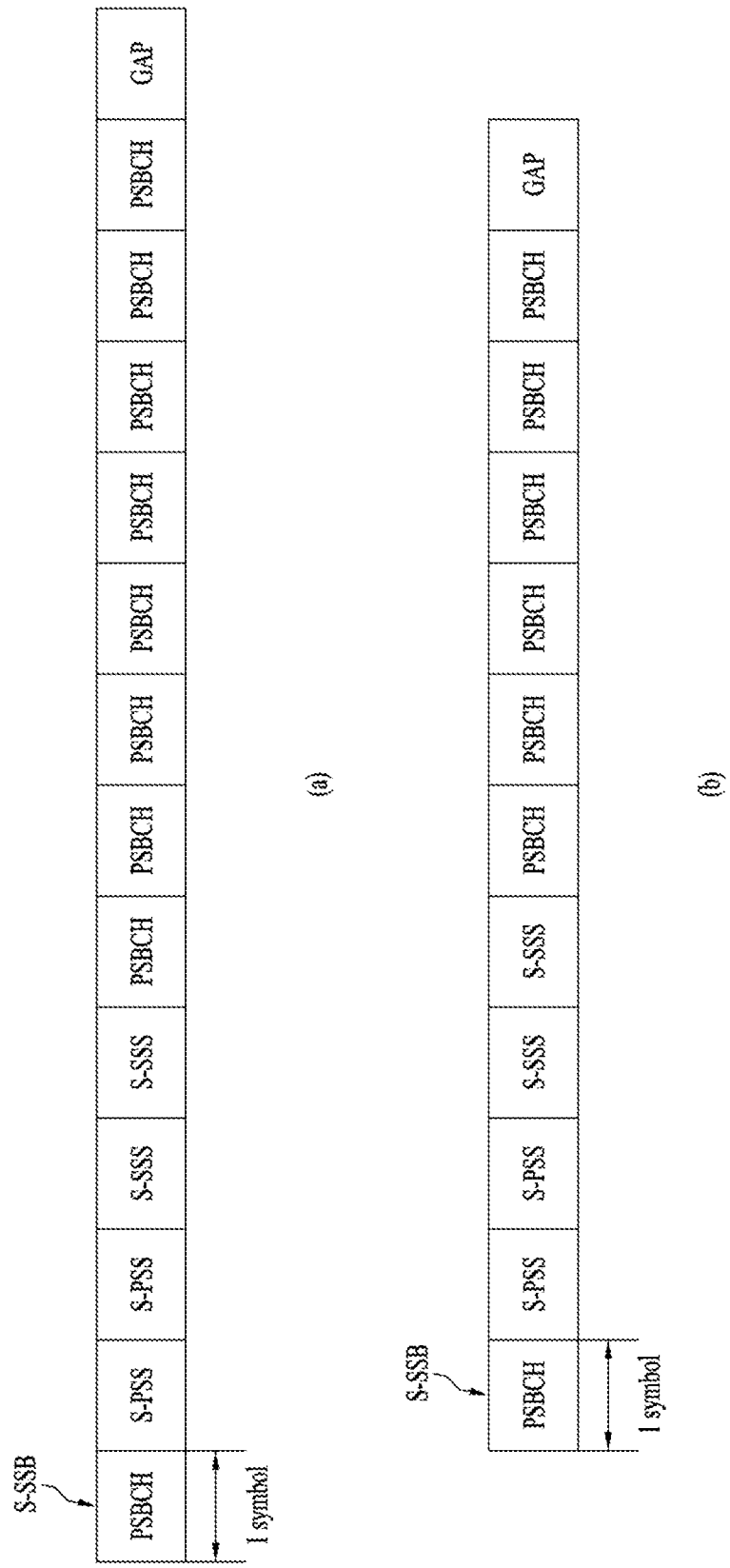
FIG. 10 shows the structures of an S-SSB according to CP types.

FIG. 10 illustrates the structures of an S-SSB according to CP types. FIG. 10-(a) shows the structure of the S-SSB when the CP type is NCP.

Figure 20:
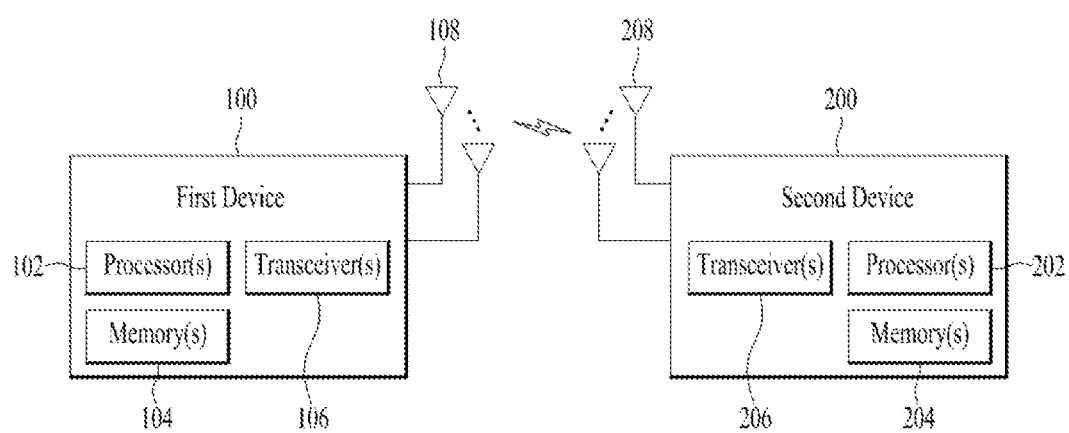
FIG. 20 illustrates wireless devices applicable to the present disclosure.

For example, the structure of the S-SSB, that is, the order of symbols to which the S-PSS, S-SSS, and PSBCH are mapped in the S-SSB transmitted by the transmitting UE when the CP type is NCP may be shown in FIG. 20.

FIG. 10-(b) shows the structure of the S-SSB when the CP type is ECP.

For example, when the CP type is ECP, the number of symbols to which the transmitting UE maps the PSBCH after the S-SSS in the S-SSB may be 6, unlike in FIG. 20. Accordingly, the coverage of the S-SSB may differ between the CP types, NCP and ECP.

Each SLSS may have an SL synchronization identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, one S-PSS of the two different S-PSSs may be associated with in-coverage, and the other S-PSS may be associated with out-of-coverage. For example, SLSS IDs of 0 to 335 may be used in in-coverage, and SLSS IDs of 336 to 671 may be used in out-of-coverage.

In order to improve the S-SSB reception performance of the receiving UE, the transmitting UE needs to optimize the transmit power according to the characteristics of respective signals constituting the S-SSB. For example, according to the peak to average power ratio (PAPR) of each signal constituting the S-SSB, the transmitting UE may determine the value of maximum power reduction (MPR) for each signal. For example, when the PAPR differs between the S-PSS and the S-SSS which constitute the S-SSB, the transmitting UE may apply an optimal MPR value to transmission of each of the S-PSS and the S-SSS in order to improve the S-SSB reception performance of the receiving UE. Also, for example, in order for the transmitting UE to perform an amplification operation on each signal, a transition period may be applied. The transition period may reserve a time required for the transmitter amplifier of the transmitting UE to perform a normal operation at the boundary where the transmit power of the transmitting UE varies. For example, in the case of FR1, the transition period may be 10 μs. For example, in the case of FR2, the transition period may be 5 μs. For example, a search window in which the receiving UE is to detect the S-PSS may be 80 ms and/or 160 ms.

Figure 11:
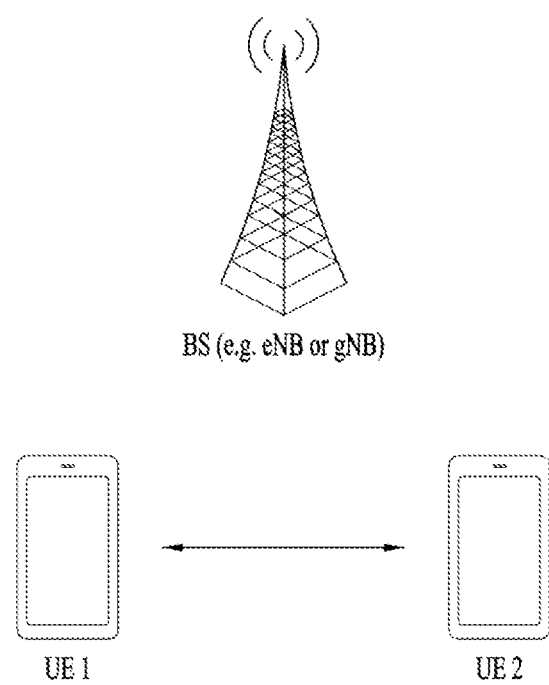
FIG. 11 illustrates UEs performing V2X or SL communication.

FIG. 11 illustrates UEs performing V2X or SL communication.

Referring to FIG. 11, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 12:
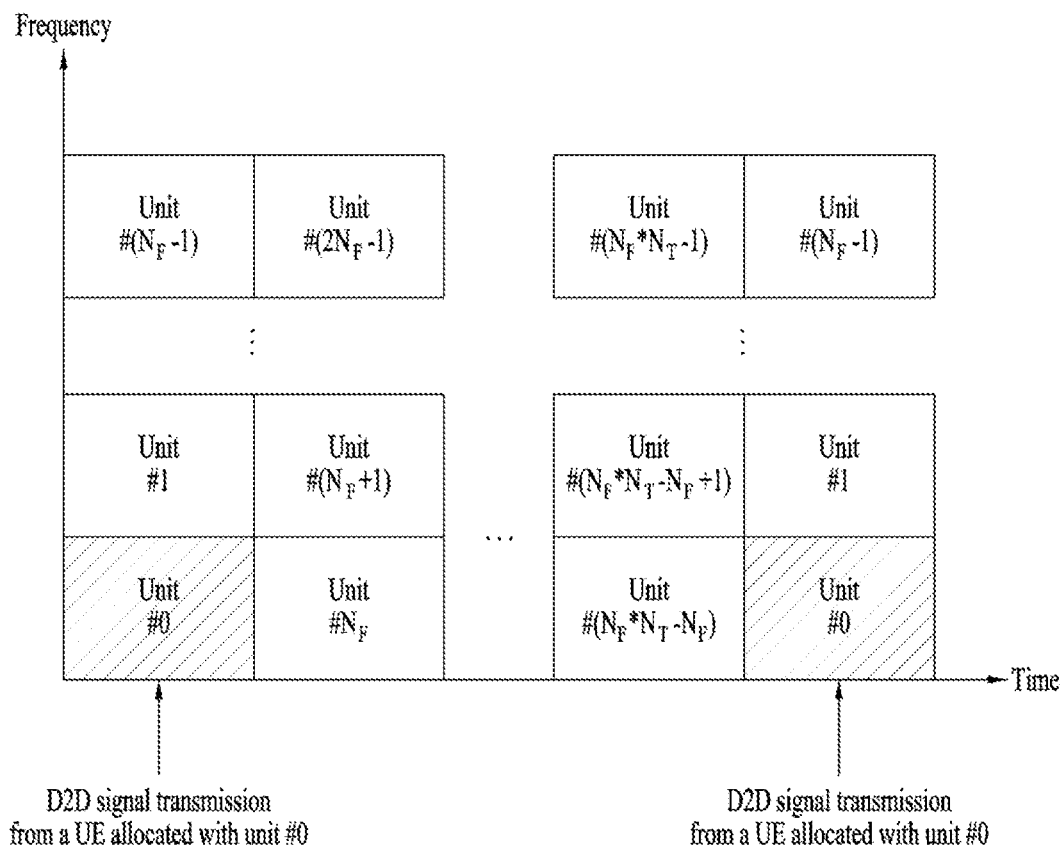
FIG. 12 illustrates resource units for V2X or SL communication.

FIG. 12 illustrates resource units for V2X or SL communication.

Referring to FIG. 12, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 12 shows an exemplary case where the resource pool is repeated with a periodicity of NT subframes.

As shown in FIG. 12, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 13:
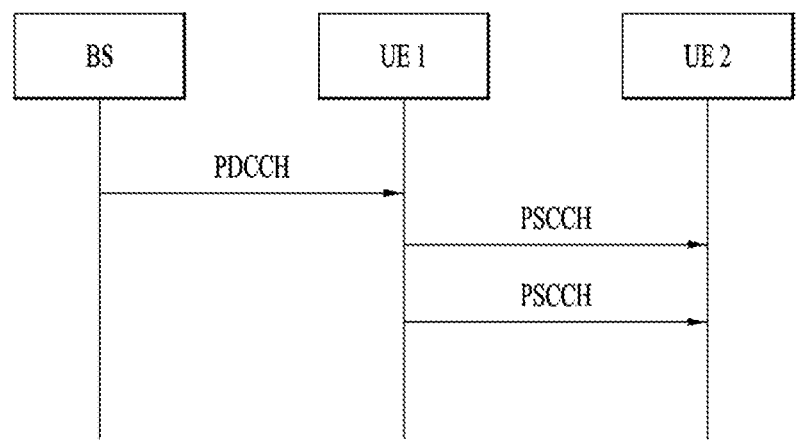
FIG. 13 illustrates a procedure in which UEs perform V2X or SL communication according to a transmission mode.
Figure 13:
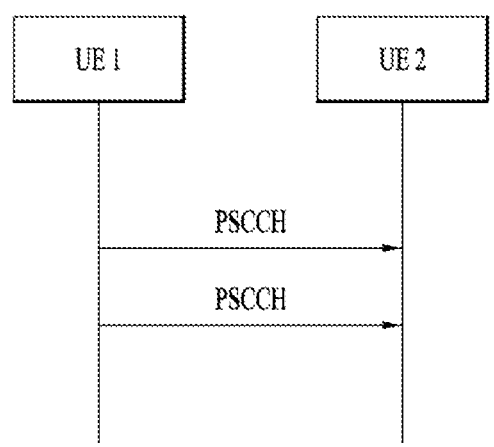

FIG. 13 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 13-(*a*) illustrates a UE operation related to LTE transmission mode 1 or LTE transmission mode 3. Alternatively, for example, FIG. 13-(*a*) illustrates a UE operation related to NR resource allocation mode 1. For example, LTE transmission mode 1 may be applied to general SL communication, and LTE transmission mode 3 may be applied to V2X communication.

For example, FIG. 13-(*b*) illustrates a UE operation related to LTE transmission mode 2 or LTE transmission mode 4. Alternatively, for example, FIG. 13-(*b*) illustrates a UE operation related to NR resource allocation mode 2.

Referring to FIG. 13-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 13-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2Nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 14:
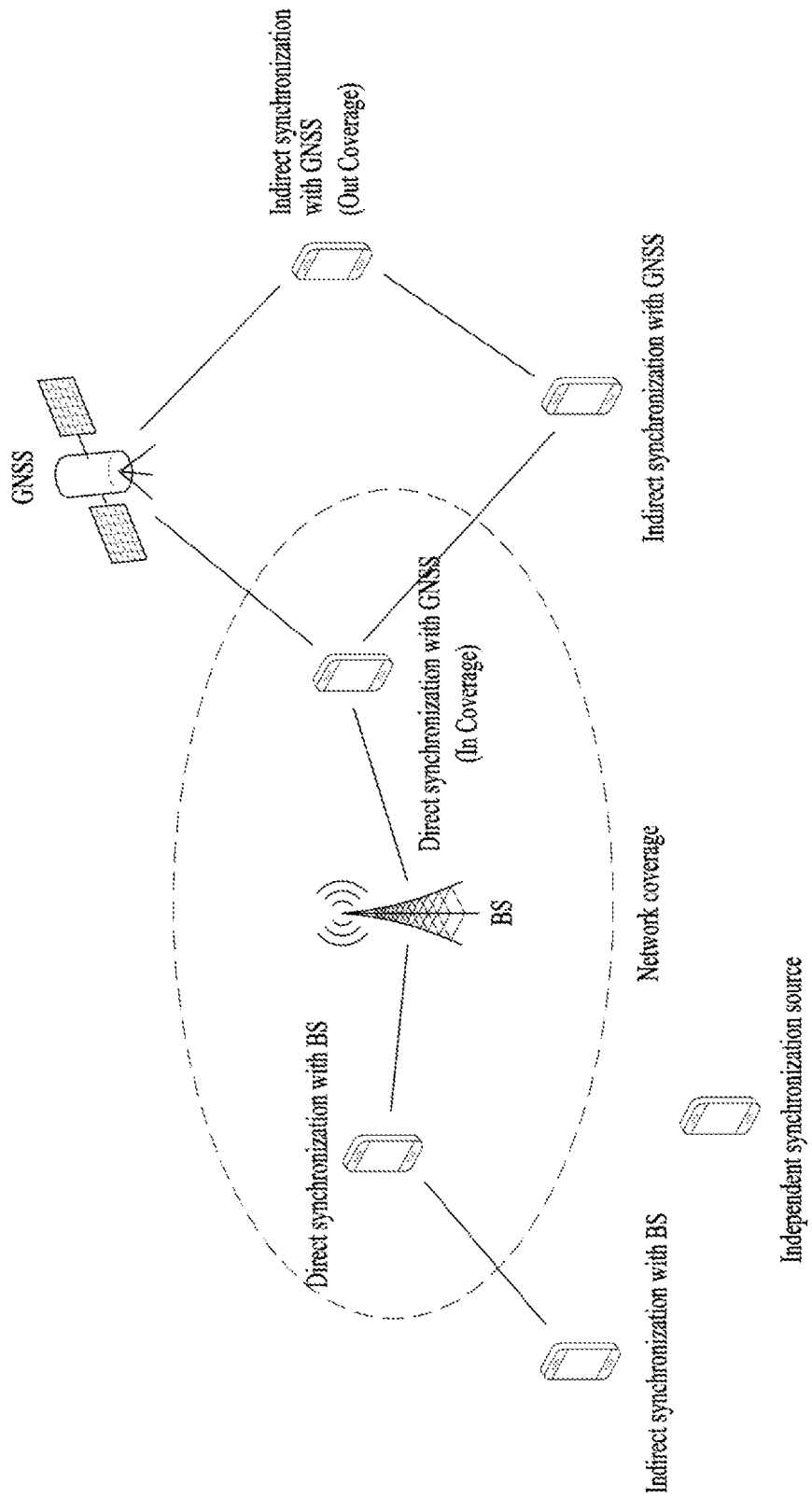
FIG. 14 illustrates a V2X synchronization source or synchronization reference to which embodiments(s) are applicable.

FIG. 14 illustrates a V2X synchronization source or reference to which the present disclosure is applicable.

Referring to FIG. 14, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not acquired synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Tables 5 and 6. Tables 5 and 6 are merely an example, and the relationship between synchronization sources and synchronization priorities may be defined in various manners.

TABLE 5

| Priority | GNSS-based synchronization | BS-based synchronization (eNB/gNB-based synchronization) |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) with low priority | Remaining UE(s) with low priority |

In Table 5 or Table 6, P0 may denote the highest priority, and P6 may denote the lowest priority. In Table 5 or Table 6, the BS may include at least one of a gNB or an eNB.

Whether to use GNSS-based synchronization or BS-based synchronization may be (pre)determined. In a single-carrier operation, the UE may derive its transmission timing from an available synchronization reference with the highest priority.

Vehicular Communications for ITS

An intelligent transport system (ITS) designed to utilize Vehicle-to-Everything (V2X) communication may mainly include an Access layer, a Network & Transport layer, a Facilities layer, an Application layer, a Security Management Entity, etc. V2X communication may be applied to various scenarios such as vehicle-to-vehicle (V2V) communication, V2N (or N2V) communication between vehicle and BS (base station), V2I (or I2V) communication between a vehicle and an RSU (Road Side Unit), I2I communication between one RSU and another RSU, a V2P (or P2V) communication between vehicle to person, and I2P (or P2I) communication between RSU and person. In this case, the vehicle, the BS (or eNB), the RSU, the person, etc., each of which serves as a subject of vehicle communication, will hereinafter be referred to as an ITS station.

Figure 15:
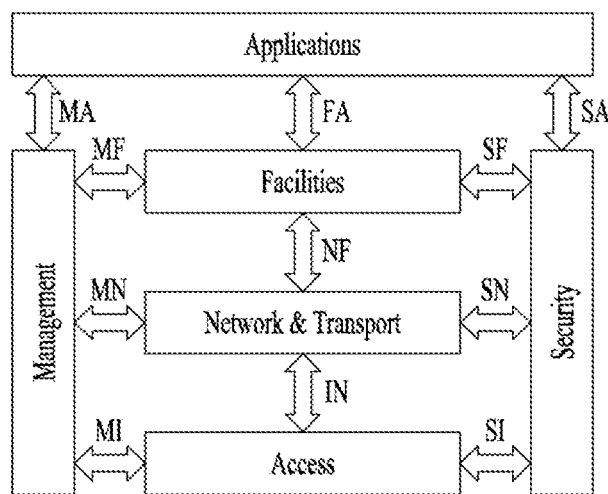
FIG. 15 is a schematic diagram illustrating an intelligent transport system (ITS) station reference architecture.

FIG. 15 is a schematic diagram illustrating an ITS (intelligent transport system) station reference architecture.

The ITS station reference architecture may include an access layer, a network & transport layer, a facilities layer, a security management entity, and an application layer that serves as the uppermost layer. Basically, the ITS station may operate to follow a layered OSI (OSI layer) model.

In detail, FIG. 15 is a conceptual diagram illustrating characteristics of the ITS station reference architecture based on the OSI model. Referring to FIG. 15, the access layer of the ITS station may correspond to an OSI Layer 1 (physical layer) and Layer 2 (data link layer), the network & transport layer of the ITS station may correspond to OSI Layer 3 (network layer) and Layer 4 (transport layer), and the facilities layer of the ITS station may correspond to an OSI Layer 5 (session layer), Layer 6 (presentation layer), and Layer 7 (application layer).

The application layer acting as the uppermost layer of the ITS station may actually implement and support a variety of use cases, and may be selectively used according to which one of the use cases is used. A management entity may serve to manage communication and operations of the ITS station as well as all the layers of the ITS station. The security entity may provide security services of all layers of the ITS station. The respective layers of the ITS station may exchange not only transmission (Tx) or reception (Rx) data to be used for V2X communication through an interface therebetween, but also additional information having various purposes with one another. The following description illustrates abbreviations of various interfaces.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

VRU-Clustering

In conventional V2X communication environments, since each vulnerable road user (VRU) transmits a safety message when collision risk increases, communication traffic may be very high in an environment in which VRUs are dense. As the communication traffic increases, the transmission efficiency of the safety message of the VRU may significantly decrease. In addition, the safety of the VRU may not be guaranteed due to a decrease in the transmission efficiency.

To solve such a problem, there is a need for a method in which only some VRUs transmit safety messages in an environment in which VRUs are dense. Specifically, to ensure the same level of safety while significantly reducing communication traffic compared to the prior art, the present disclosure proposes the following methods: listen before send; clustering by area; clustering by collision risk; clustering by expected collision time and area; and clustering by combined conditions.

The safety message may be a message transmitted in a sidelink signal. Specifically, the message or safety message may be transmitted to other VRUs, UEs, road side units (RSUs), etc. in any one of the following sidelink signal: a physical sidelink broadcast channel (PSBCH), a physical sidelink control channel (PSCCH), a physical sidelink shared channel (PSSCH), a physical sidelink discovery channel (PSDCH), a primary sidelink synchronization signal (PSSS), a secondary sidelink synchronization signal (SSSS), and a physical sidelink feedback channel (PSFCH). Hereinafter, for convenience of description, transmission of the message or safety message may be interpreted to mean that the message or safety message is transmitted in the sidelink signal.

In addition, the safety message or message may be transmitted by a VRU, a vehicle, an RSU, a UE, and so on. Here, the VRU may correspond to a UE, a UE located in a vehicle, an RSU, and so on.

When a VRU calculates the risk of collision with a vehicle, if the risk of collision exceeds a prescribed level, the VRU may start transmission of a VRU safety message. Alternatively, the VRU may switch to a transmission start mode and then start the transmission of the VRU safety message. Thereafter, the transmission of the VRU safety message may be performed at a fixed or random transmission interval, or the interval may be dynamically adjusted according to the movement of the VRU. The safety message transmitted from the VRU may include not only a warning about the risk of collision but also other information in order to minimize the risk of collision between the VRU and vehicle.

Figure 16:
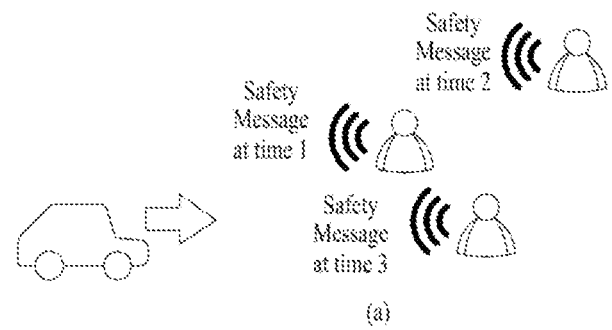
FIG. 16 is a diagram for explaining a method for a vulnerable road user (VRU) to determine whether to transmit a safety message based on clustering methods.
Figure 16:
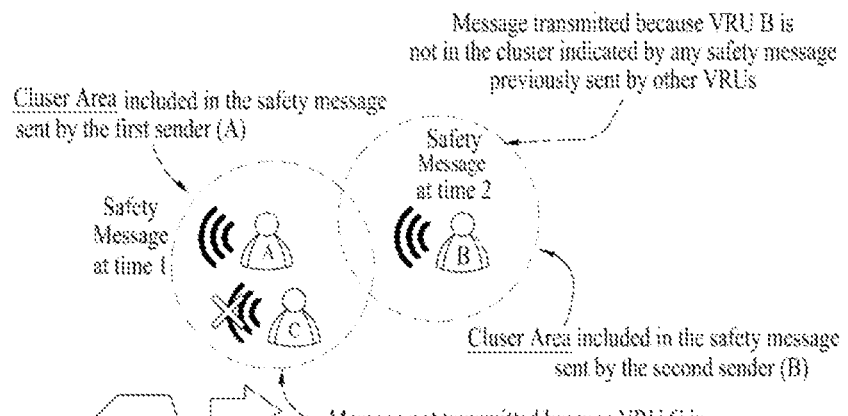
Figure 16:
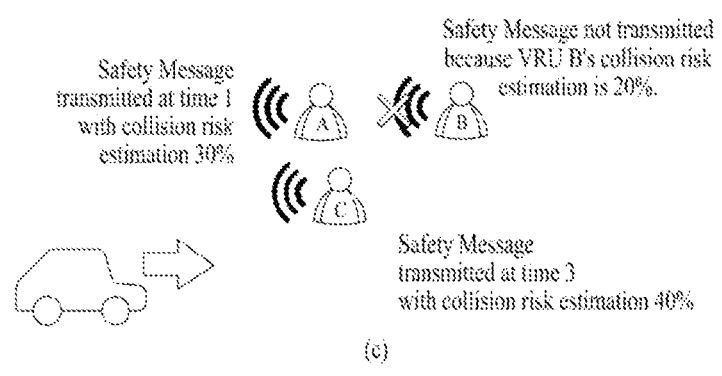

FIG. 16 is a diagram for explaining a method for a VRU to determine whether to transmit a safety message based on clustering methods.

Referring to FIG. 16(a), VRUs or UEs (VRUs) may transmit safety messages at different timings. In this case, communication traffic may significantly increase due to transmission of a plurality of safety messages in a space where VRUs are dense. To solve this problem, it is necessary to control VRUs such that only some VRUs transmit safety messages in an area where VRUs are dense.

Clustering-based safety message transmission methods may include the following methods: listen before send, clustering by area, clustering by collision risk, clustering by expected collision time and area, and clustering by combined conditions. The clustering methods determine whether to transmit a safety message depending on whether a safety message is received from another VRU for a predetermined period of time before transmission of the safety message and/or according to results of monitoring information included in the safety message received from the other VRU. Here, the predetermined period of time may be determined based on a time at which it is determined that the transmission of the safety message is required due to detection of risk or based on a transmission cycle. For example, the predetermined period of time may be determined as a time period from a time when it is determined by the risk detection (or transmission cycle) that the transmission of the safety message is required after activation of a V2X application to a time when the safety message is transmitted.

First, according to the listen before send, a VRU may determine whether to transmit its safety message based on whether a safety message is received from another VRU for a predetermined period of time (or until the safety message is transmitted) before transmitting the safety message. For example, the VRU may not transmit its safety message or may skip the transmission if the VRU receives the safety message for the predetermined period of time.

Alternatively, the VRU may determine whether to transmit its safety message based on the purpose and/or type of the safety message received from the other VRU for the predetermined period of time (or until the safety message is transmitted) before transmitting the safety message. For example, if the location of the other VRU, which has transmitted the safety message, is adjacent to the location of the VRU (for example, when the zone ID is the same), the VRU may determine that the transmission of the safety message is unnecessary and stop or drop the transmission of the safety message because a safety message indicating the presence of the other VRU at the location related to the VRU has been transmitted.

Referring to FIG. 16(b), a VRU may determine whether to transmit a safety message according to the clustering by area. In this case, the VRU may transmit a safety message including information on a representative geographic area (i.e., cluster area information) or determine to transmit its safety message based on geographic area information included in a safety message received from another VRU.

Specifically, if a VRU is located in a cluster area according to geographic area information included in a safety message received for a predetermined period of time, the VRU may not transmit its safety message or may drop the transmission. On the other hand, if no cluster area information is included in the safety message or if the VRU is not located within the cluster area, the VRU may transmit its safety message. Alternatively, when the VRU drops the transmission of the safety message, the VRU may transmit a message or signal for joining in the cluster area to another VRU that has transmitted the safety message.

Alternatively, when the VRU drops the transmission of the safety message, the VRU may transmit the message or signal for joining in the cluster area to the other VRU that has transmitted the safety message.

Referring to FIG. 16(c), a VRU may determine whether to transmit a safety message based on the clustering by collision risk. According to this method, the VRU may transmit a safety message including an estimated or calculated collision risk (CR) value or determine whether to transmit its safety message based on a CR value included in a safety message received from another VRU.

Specifically, when transmitting a safety message, a VRU may include a CR value related to a condition for the transmission of the safety message. The VRU may obtain a CR value related to another VRU from a safety message received from the other VRU and determine whether to transmit the safety message based on the obtained CR value. For example, if an estimated or calculated CR value is less than or equal to (or less than) the obtained CR value, the VRU may not transmit its safety message or may drop the safety message. Alternatively, when the estimated or calculated CR value is more than (or more than or equal to) the obtained CR value, the VRU may transmit its safety message including the estimated or calculated CR value.

Alternatively, a VRU may determine whether to transmit a safety message based on the clustering by estimated or expected collision area/time (clustering by expected collision time and area). Specifically, the VRU may transmit a safety message including information on an expected collision area and an expected collision time (information on the expected collision area/time) based on surrounding environment information (CAM, DENM, TNM, etc.) and its mobility information. Alternatively, the VRU may determine whether to transmit its safety message based on collision area/time information obtained from a safety message received from another VRU.

For example, the VRU may not transmit or may drop its safety message when a collision area/time obtained from a safety message received within a predetermined period of time corresponds to the expected collision area/time. Alternatively, the VRU may transmit the safety message including the information on the expected collision area/time when the collision area/time obtained from the safety message received within the predetermined period of time (or before transmission of the safety message) does not correspond to the expected collision area/time.

As described above, a VRU may transmit a safety message in each transmission cycle of the safety message or in each specific cycle according to the clustering methods. In addition, the VRU may determine whether to transmit the safety message based on a combination of at least two of the above-described clustering-based safety message transmission methods.

Figure 17:
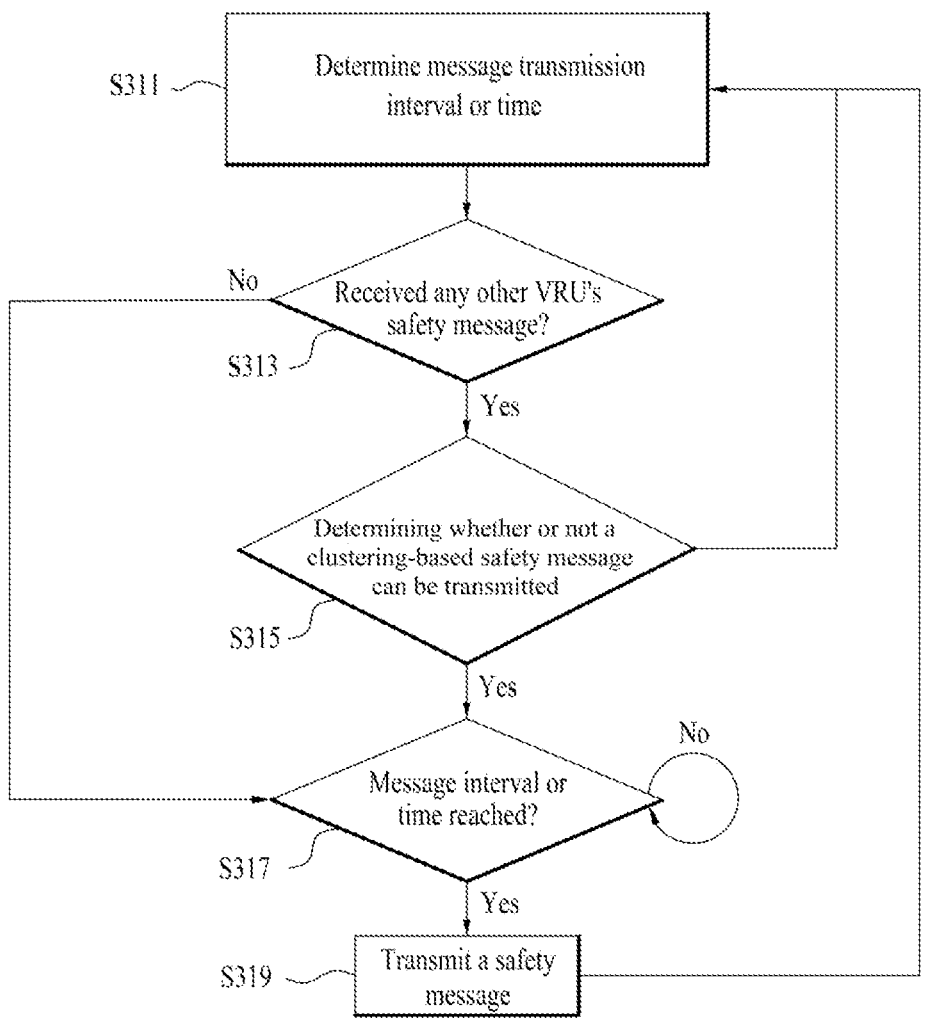
FIG. 17 is a flowchart illustrating a method for a VRU to determine whether to transmit a safety message according to a clustering-based safety message transmission method.

FIG. 17 is a flowchart illustrating a method for a VRU to determine whether to transmit a safety message according to a clustering-based safety message transmission method.

Referring to FIG. 17, the VRU may transmit the safety message or a message indicating its presence in each predetermined transmission cycle (or periodically when an estimated CR value is more than or equal to a specific value) (S311). For example, the VRU may determine the transmission timing of the safety message based on the predetermined transmission cycle.

Next, the VRU may monitor whether a safety message (or a message indicating presence) is received from another VRU for a predetermined period of time (or before the determined transmission timing) (S313). When receiving the safety message (or the message indicating the presence) from the other VRU, the VRU may determine whether to transmit the safety message to be transmitted based on the received safety message (or the message indicating the presence) (S315).

Specifically, a method of determining whether to transmit a safety message (or a message indicating presence) based on another safety message may vary depending on the above-described clustering-based safety message transmission methods. Hereinafter, particular embodiments will be described.

1. According to the listen before send, the VRU may be allowed to transmit its safety message when no safety message is received for a predetermined period of time (before the transmission of the safety message).

2. According to the clustering by area, the VRU may determine whether to transmit a safety message based on a geographic area obtained from a second message. For example, when at least one safety message is received for a predetermined period of time and when the VRU is located in a geographic area obtained from the safety message, the VRU may not be allowed to transmit the safety message. Alternatively, when the VRU is not located in the geographic area obtained from the safety message or when only a safety message including no geographic area information is received, the VRU may transmit the safety message. When the VRU intends to transmit a representative safety message for a specific area, the VRU may transmit a safety message including information on the specific area.

3. According to the clustering by collision risk, the VRU may determine whether to transmit a safety message based on a CR value included in a safety message. For example, when at least one safety message is received for a predetermined period of time and when a CR value obtained from the safety message is less than or equal to a CR value expected by the VRU, the VRU may transmit the safety message by including the expected CR value. Alternatively, when the CR value obtained from the safety message is more than the CR value expected by the VRU, the VRU may not transmit or may drop the safety message.

4. According to the clustering by expected collision time and area, the VRU may determine whether to transmit a safety message based on a collision area/time included in a safety message. For example, when at least one safety message is received for a predetermined period of time and when a collision area/time obtained from the safety message is different from a collision area/time expected by the VRU, the VRU may transmit the safety message by including information on the expected collision area/time. Alternatively, when the collision area/time obtained from the safety message corresponds to the collision area/time expected by the VRU or when only a safety message including no collision area/time information is received, the VRU may not transmit or may drop the safety message.

Alternatively, the VRU may determine whether to transmit a safety message based on the clustering by combined conditions. For example, when the clustering by area and the clustering by collision risk are combined, the VRU may not transmit or may drop the safety message if the VRU is located in a geographic area obtained from a received safety message or if a CR value obtained from the received safety message is more than a CR value expected by the VRU. Alternatively, if the VRU is located in the geographic area obtained from the received safety message and the CR value obtained from the received safety message is more than the expected CR value, the VRU may not perform or may drop the safety message transmission.

Next, when the transmission conditions are satisfied so that transmission of a first safety message is allowed, the VRU may transmit the first safety message at the determined transmission timing (S317 and S319).

When the VRU does not perform or drops the safety message transmission as described above, the VRU may determine again whether to resume the safety message transmission in the next safety message transmission cycle according to the above-described methods. Alternatively, when the VRU does not transmit or drops the safety message, the VRU may stop the safety message transmission for a predetermined threshold period. After the predetermined threshold time elapses, the VRU may determine whether to resume the safety message transmission according to the above-described methods.

According to the clustering-based safety message transmission methods (or message indicating the presence based on clustering), when the VRU fails to receive a general safety message, a safety message including information on a specific area, or a safety message including information on a specific collision point/time for a predetermined period of time (or before transmission of the safety message), the VRU may be allowed to transmit its safety message.

Alternatively, when the VRU receives at least one safety message for the predetermined period of time, the VRU may obtain specific information included in the received safety message and determine whether to transmit the safety message based on the obtained specific information. Here, the specific information may be determined based on the clustering-based safety message transmission methods.

According to the above-described methods, a VRU to transmit a safety message may be selected from among a plurality of VRUs based on the area, type, collision event, and/or CR estimation value. Accordingly, it is possible to minimize an increase in communication traffic due to redundant transmission of safety messages in an environment in which VRUs are dense or minimize power consumption due to redundant transmission of safety messages by the VRUs.

Specifically, according to the listen before send, a VRU may determine whether another safety message is received without considering the content of its safety message before transmission of the safety message, thereby minimizing redundant transmission of safety messages. Alternatively, the VRU may determine whether to transmit its safety message based on whether a safety message with a predetermined threshold or higher is received before transmitting the safety message. For example, when the safety message with the predetermined threshold or higher is received, the VRU may recognize that the safety message is transmitted in an area adjacent to the VRU so that the VRU may not transmit its safety message. In this case, it is possible to minimize redundant safety message transmission between VRUs within a prescribed range from the VRU.

According to the clustering by area, VRUs within a specific geographic area may form one cluster, and one representative VRU in the cluster (for example, a VRU that first transmits a safety message including information on the specific geographic area) may transmit a safety message. In this case, it is possible to minimize redundant safety message transmission between VRUs within a prescribed range from the VRU.

According to the clustering by collision risk, VRUs within a specific geographic area may form one cluster, and one representative VRU in the cluster (for example, a VRU that transmits a safety message with the highest CR value) may transmit a safety message. In this case, other VRUs in the cluster are not allowed to transmit safety messages.

According to the clustering by expected collision time and area, VRUs that expect a specific collision event may form one cluster or group, and only a representative VRU in the cluster may transmit a safety message. In this case, other VRUs in the cluster may not transmit safety messages. However, the other VRUs in the cluster may determine whether to resume safety message transmission in each cycle. For example, the other VRUs may receive safety messages from the surroundings in the next transmission cycle and determine whether to resume the safety message transmission based on collision area/time information included in the received safety messages.

When a VRU determines not to perform safety message transmission as described above, the VRU may omit or skip the safety message transmission at the time when the safety message transmission is determined. Then, the VRU may determine again whether to resume the safety message transmission from the transmission time to the next safety message transmission time according to the above-described methods. Alternatively, when the VRU does not perform or drops the safety message transmission, the VRU may stop the safety message transmission for a predetermined threshold time. After the predetermined threshold time elapses, the VRU may determine whether to resume the safety message transmission according to the above-described methods.

As described above, the proposed method may prevent specific type of safety messages, safety messages in a specific area, or safety message for a specific collision location and time from being transmitted more than necessary. In other words, only a representative VRU in a specific group or cluster may be allowed to transmit a safety message or a message indicating its existence by clustering VRUs according to the above-described methods, thereby minimizing an unnecessary increase in communication traffic/signal load in an environment where VRUs are dense and minimizing power consumption of VRUs due to unnecessary redundant safety message transmission.

Figure 18:
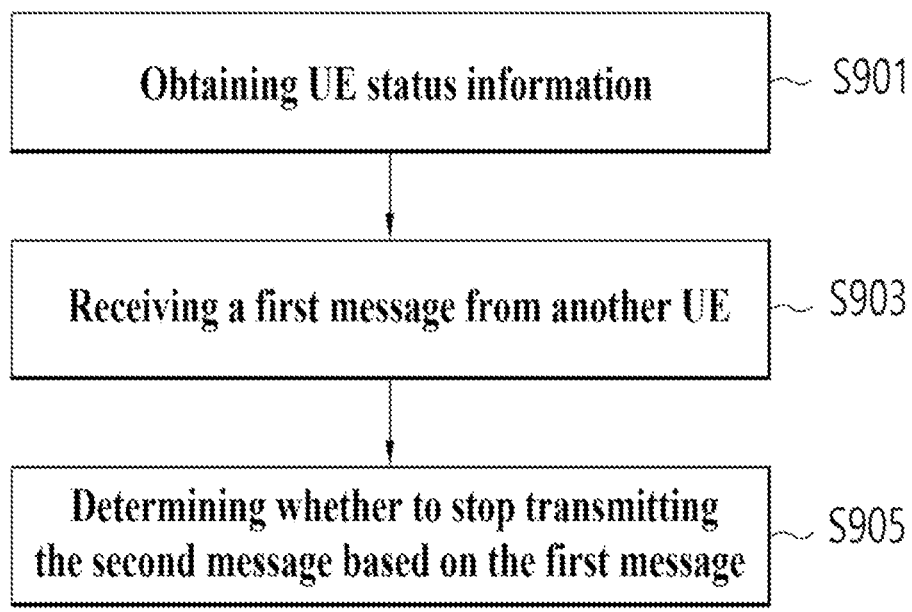
FIG. 18 is a flowchart illustrating a method for a user equipment (UE) to determine whether to transmit a second message based on a first message received from another UE.

FIG. 18 is a flowchart illustrating a method for a UE to determine whether to transmit a second message based on a first message received from another UE.

Referring to FIG. 18, the UE may obtain state information by measuring its own geographic location, speed, movement direction, etc. (S901). In addition, the UE may predict whether there is a risk of collision based on the state information and a personal safety message (PSM), a cooperative awareness message (CAM), a decentralized environmental notification message (DENM), a threat notification message (TNM), and so on, which are transmitted from other UEs. Alternatively, the UE may calculate a CR value.

The UE may receive a first message transmitted by neighboring UEs (S903). The UE may determine whether to perform safety message transmission according to the above-described clustering methods or drop the safety message transmission.

Alternatively, the UE may determine how to perform the clustering-based safety message transmission based on information included in the first message. For example, when the first message includes information on a geographic area, the UE may determine whether to transmit the second message according to the clustering by area. Alternatively, when the first message includes an expected or estimated CR value, the UE may determine whether to transmit the second message according to the clustering by collision risk. Alternatively, when the first message includes information on a collision area and a collision time, the UE may determine whether to transmit the second message according to the clustering by expected collision time and area.

Alternatively, when the first message includes information on at least two or more clustering methods, the UE may determine whether to transmit the second message by combining the clustering methods based on each piece of information.

The UE may determine whether to transmit the second message of the UE based on the received first message (S905). When the received first message includes information on a geographic area, the UE may determine whether to transmit the second message based on the clustering by area.

Specifically, when the received first message includes the information on the geographic area, if it is determined that the measured location is within the geographic area, the UE may stop transmitting the second message. In this case, even if the transmission of the second message is stopped, another UE that has transmitted the first message may transmit a safety message or a message indicating its presence as a representative. Thus, the UE may minimize power consumption due to transmission of a message indicating its presence while ensuring its own safety. The geographic area information may include information on the shape, size, and reference point of the geographic area. Alternatively, the geographic area information may include information on a zone ID indicating a specific geographic area.

Alternatively, when the received first message includes no geographic area information, the UE may transmit the second message, instead of stopping the transmission of the second message. In other words, when the received first message includes no geographic area information, the UE may determine that there is no cluster or group formed around the UE and periodically transmit the second message.

Alternatively, if the measured geographic location is not within the geographic area obtained from the received first message, the UE may transmit the second message, instead of stopping the transmission of the second message. In other words, when the received first message includes no geographic area information, the UE may determine that there is no cluster or group formed in a geographic area around which the UE is located and periodically transmit the second message.

Alternatively, the UE may transmit the second message by including information on a geographic area (or cluster area) which the UE desires to represent as a representative in order to attempt to form a cluster or group in the geographic area (or cluster area). In this case, the UE may periodically transmit the second message, which is the message or the safety message, on behalf of other UEs included in the cluster area.

Alternatively, when the first message further includes a CR value in addition to geographic area information, the UE may determine whether to transmit the second message by additionally considering the CR value according to the clustering by area and the clustering by collision risk. For example, when obtaining information on a geographic area and a CR value from the first message, the UE may compare the obtained CR value with a CR value estimated based on the state information and/or surrounding messages and then determine whether to transmit the second the message. Specifically, when the estimated CR value is less than the obtained CR value and the UE is located in the obtained geographic area, the UE may stop transmitting the second message or may not transmit the second message.

Alternatively, when the UE is located in the obtained geographic area but the estimated CR value is greater than the obtained CR value, the UE may transmit the second message. In this case, even if the UE is located in the same geographic area as others UE, the safety of the UE, which has a higher risk of collision, may be preferentially guaranteed.

Alternatively, when specific time information is further included in the first message in addition to geographic area information, the UE may determine whether to transmit the second message by additionally considering the specific time information according to the clustering by collision area/time (clustering by expected collision time and area). Specifically, when obtaining geographic area information and specific time information from the first message, the UE may determine that the first message includes information on an expected collision area and collision time according to the above-described clustering by collision area/time (clustering by expected collision time and area) and then determine whether to transmit the second message based on the obtained geographic area information area and specific time information.

For example, the UE may estimate a collision risk area and time based on the state information and the CAM, DENM, PSM, etc. obtained from the surroundings and determine whether the estimated collision risk area and time correspond to a collision risk area and time included in the first message. If the estimated collision risk area and time correspond to the collision risk area and time included in the first message, the UE may stop transmitting the second message or may not transmit the second message.

Each of the first message and the second message may be a vulnerable road user awareness message (VAM). That is, each of the first message and the second message may be a safety message transmitted from a UE or (VRU) to inform its presence for the safety thereof. In addition, each of the first message and the second message may be a V2X message.

Alternatively, the UE may stop transmitting the second message until the UE leaves a geographic area obtained from the first message. That is, the UE may resume the transmission of the second message upon detecting that the UE leaves the obtained geographic area.

Alternatively, when the UE stops transmitting the second message based on the first message, the UE may determine whether to resume the transmission of the second message in the next transmission cycle according to the above-described methods.

Alternatively, when the UE receives the first message periodically, the UE may determine whether to resume the transmission of the second message when the received strength of the first message is less than a predetermined strength threshold.

Communication system example to which the present disclosure is applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 19:
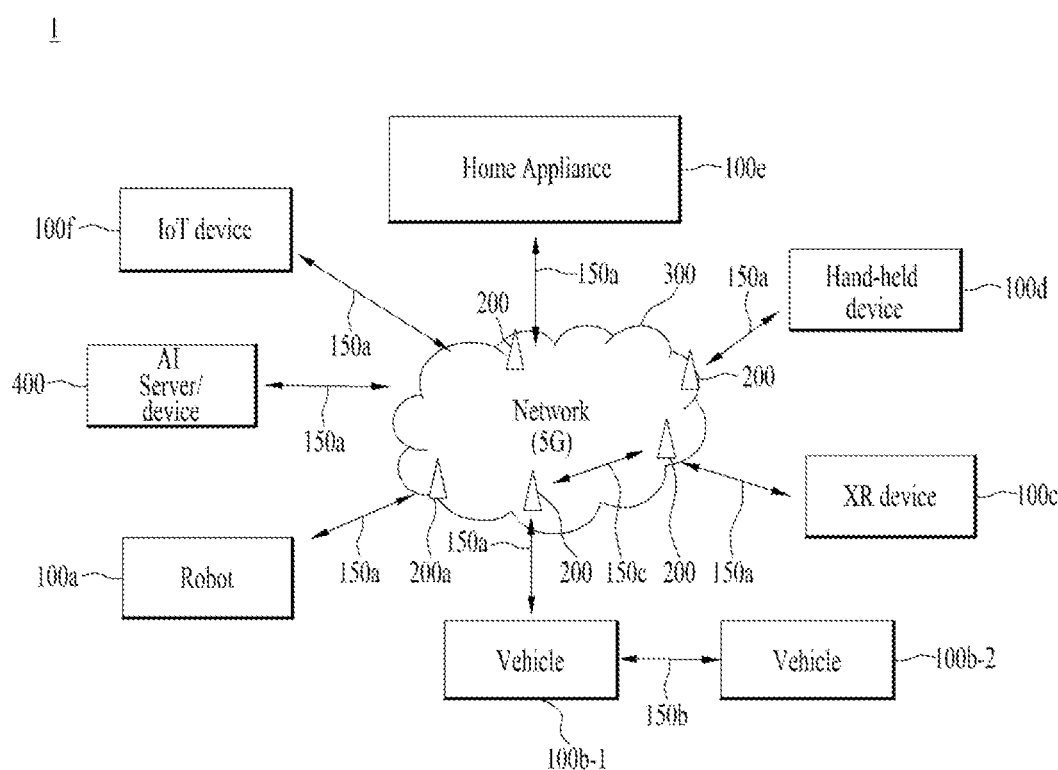
FIG. 19 illustrates a communication system applied to the present disclosure.

FIG. 19 illustrates a communication system applied to the present disclosure.

Referring to FIG. 19, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

FIG. 20 illustrates a wireless device applicable to the present disclosure.

Referring to FIG. 20, a first wireless device 100 and a second wireless device 200 may transmit radio signals through a variety of RATs (e.g., LTE and NR). Herein, the first wireless device 100 and the second wireless device 2001 may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, a UE may include the processor(s) 102 connected to an RF transceiver and the memory(s) 104. The memory(s) 104 may include at least one program for performing the operations related to the embodiments described with reference to FIGS. 16 to 18.

Specifically, the processor(s) 102 may be configured to: obtain state information including location information; control the RF transceiver to receive a first message from a second UE; and determine whether to stop transmission of a second message based on the state information and whether information on a geographic area is included in the first message. In addition, the processor(s) 102 may be configured to perform the operations according to the embodiments described with reference to FIGS. 15 to 18 based on the at least one program included in the memory(s) 104.

Alternatively, a chipset including the processor(s) 102 and the memory(s) 104 may be configured. In this case, the chipset may include: at least one processor; and at least one memory operably connected to the at least one processor and configured to, when executed, cause the at least one processor to perform operations. The operations may include: obtaining state information including location information; controlling a RF transceiver to receive a first message from a second UE; and determining whether to stop transmission of a second message based on the state information and whether information on a geographic area is included in the first message. In addition, the operations may include operations according to the embodiments described with reference to FIGS. 15 to 18 based on the program included in the memory(s) 104.

Alternatively, a computer-readable storage medium including at least one computer program that causes at least one processor to perform operations may be provided. The operations may include: obtaining state information including location information; controlling a RF transceiver to receive a first message from a second UE; and determining whether to stop transmission of a second message based on the state information and whether information on a geographic area is included in the first message. In addition, the computer program may include programs for performing the operations according to the embodiments described with reference to FIGS. 15 to 18.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 21:
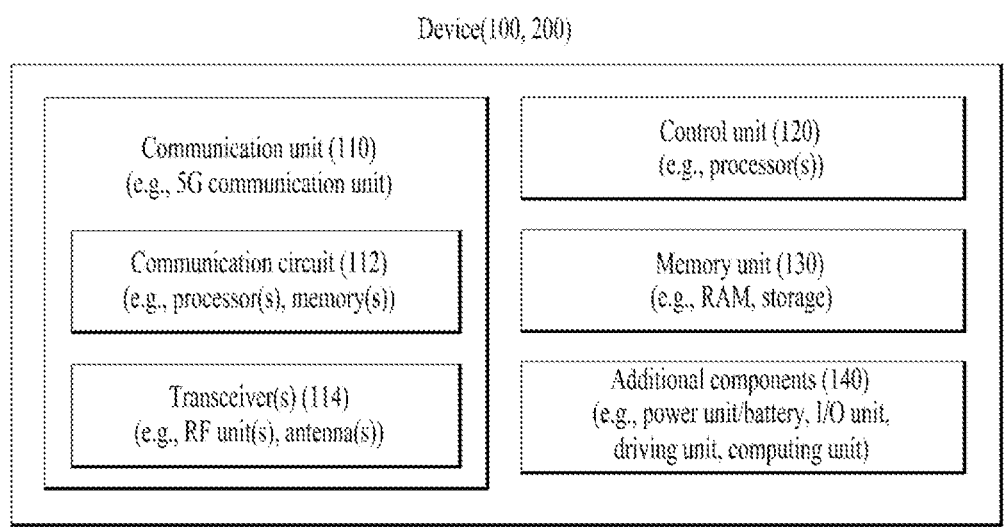
FIG. 21 illustrates another example of a wireless device to which the present disclosure is applied. The wireless device may be implemented in various forms according to use-example s/services.

FIG. 21 illustrates another example of a wireless device applied to the present disclosure. The wireless device may be implemented in various forms according to a use-case/service (refer to FIG. 19)

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Examples of Mobile Devices to which the Present Disclosure is Applied

Figure 22:
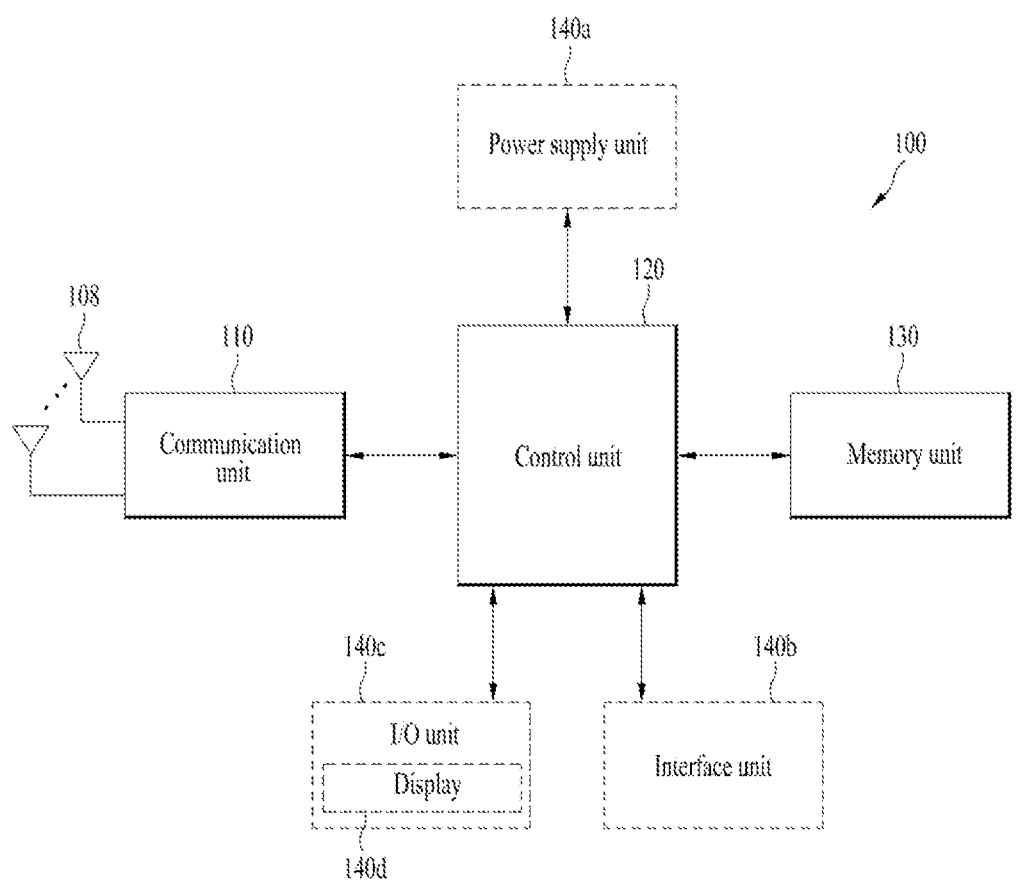
FIG. 22 illustrates a hand-held device applied to the present disclosure.

FIG. 22 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 30, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
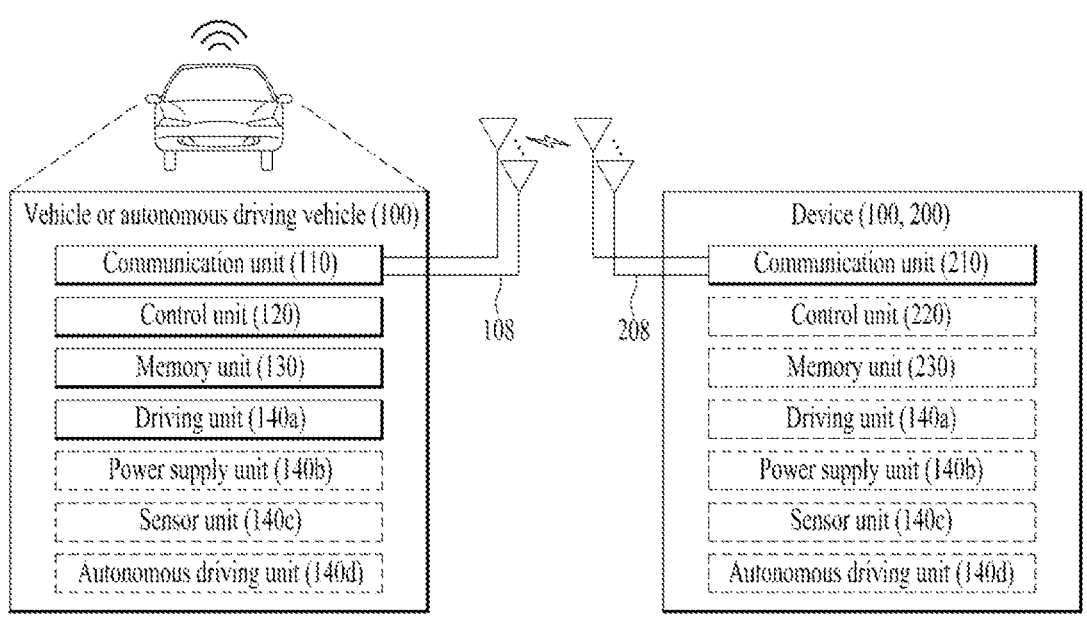
FIG. 23 illustrates a vehicle or an autonomous driving vehicle applied to the present disclosure.

Examples of Vehicles or Autonomous Vehicles to which the Present Disclosure is Applied FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), or Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:
1. A method of transmitting a message by a first user equipment (UE) in a wireless communication system supporting sidelink, the method comprising:
obtaining state information including surrounding environment information and geographic location information of the first UE;
periodically transmitting a second message based on the state information, wherein the second message is a safety message triggered based on a collision risk predicted based on the state information;
receiving a first message including information on a cluster area for forming a plurality of UEs into one cluster from a second UE; and
stopping the periodic transmission of the second message based on the geographical location information of the first UE being located in the cluster area, wherein the second message is transmitted through at least one of a physical sidelink broadcast channel (PSBCH), a physical sidelink control channel (PSCCH), a physical sidelink shared channel (PSSCH), and a physical sidelink discovery channel (PSDCH).

2. The method of claim 1, wherein based on the reception of the first message not including the information on the cluster area, the periodic transmission of the second message is maintained.

3. The method of claim 1, wherein the first message further includes a first collision risk value.

4. The method of claim 3,
wherein the collision risk is predicted based on a second collision risk value calculated based on the state information, and
wherein the periodic transmission of the second message is stopped based on i) the first collision risk value greater than the second collision risk value and ii) the geographical location information of the first UE being located in the cluster area.

5. The method of claim 1, wherein the first message further includes information on a first collision area and a first collision time.

6. The method of claim 5,
wherein the first UE predicts a second collision area and a second collision time based on the state information, and
wherein the periodic transmission of the second message is stopped based on the first message including the first collision area corresponding to the second collision area and the first collision time corresponding to the second collision time, the transmission of the second message is stopped.

7. The method of claim 1, wherein the information on the information on the cluster area includes information on a reference location, information on a shape of the geographic area, and information on a size of the geographic area.

8. The method of claim 1, wherein each of the first message and the second message is a vulnerable road user awareness message (VAM).

9. A first user equipment (UE) configured to transmit a message in a wireless communication system supporting sidelink, the first UE comprising:
a radio frequency (RF) transceiver; and
a processor connected to the RF transceiver,
wherein the processor is configured to:
obtain state information including surrounding environment information and geographic location information of the first UE;
control the RF transceiver to periodically transmit a second message based on the state information, wherein the second message is a safety message triggered based on a collision risk predicted based on the state information;
control the RF transceiver to receive a first message including information on a cluster area for forming a plurality of UEs into one cluster from a second UE; and
stop the periodic transmission of the second message based on the geographical location information of the first UE being located in the cluster area,
wherein the second message is transmitted through at least one of a physical sidelink broadcast channel (PSBCH), a physical sidelink control channel (PSCCH), a physical sidelink shared channel (PSSCH), and a physical sidelink discovery channel (PSDCH).

10. A chipset configured to transmit a message in a wireless communication system supporting sidelink, the chipset comprising:
at least one processor; and
at least one memory operably connected to the at least one processor and configured to, when executed, cause the at least one processor to perform operations comprising:
obtaining state information including surrounding environment information and geographic location information;
periodically transmitting a second message based on the state information, wherein the second message is a safety message triggered based on a collision risk predicted based on the state information;
receiving a first message from a second user equipment (UE) including information on a cluster area for forming a plurality of UEs into one cluster; and
stopping the periodic transmission of the second message based on the geographical location information of the first UE being located in the cluster area,
wherein the second message is transmitted through at least one of a physical sidelink broadcast channel (PSBCH), a physical sidelink control channel (PSCCH), a physical sidelink shared channel (PSSCH), and a physical sidelink discovery channel (PSDCH).

11. The method of claim 1, wherein the safety message for the one cluster is transmitted only by the second UE.

* * * * *